(12) United States Patent
Yang et al.

(10) Patent No.: US 11,831,203 B2
(45) Date of Patent: Nov. 28, 2023

(54) CORE-BOBBIN ASSEMBLY AND MOTOR COOLING METHOD USING THE SAME

(71) Applicant: HYUNDAI MOBIS Co., Ltd., Seoul (KR)

(72) Inventors: Hye Seong Yang, Gwangju (KR); Yeong Woo Seo, Busan (KR); Seong Jun Hwang, Yongin-si (KR); Jung Kyu Yim, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 325 days.

(21) Appl. No.: 17/071,571

(22) Filed: Oct. 15, 2020

(65) Prior Publication Data

US 2021/0119501 A1    Apr. 22, 2021

(30) Foreign Application Priority Data

Oct. 16, 2019    (KR) ........................ 10-2019-0128566

(51) Int. Cl.
| | |
|---|---|
| *H02K 1/20* | (2006.01) |
| *B60K 1/00* | (2006.01) |
| *B60K 1/02* | (2006.01) |
| *H02K 1/14* | (2006.01) |
| *H02K 3/52* | (2006.01) |
| *H02K 9/19* | (2006.01) |
| *B60K 11/02* | (2006.01) |
| *H02K 5/20* | (2006.01) |

(52) U.S. Cl.
CPC ................ *H02K 1/20* (2013.01); *B60K 1/00* (2013.01); *B60K 11/02* (2013.01); *H02K 1/146* (2013.01); *H02K 3/522* (2013.01); *H02K 5/20* (2013.01); *B60K 2001/006* (2013.01); *H02K 2203/12* (2013.01)

(58) Field of Classification Search
CPC .......... H02K 1/146; H02K 1/148; H02K 1/20; H02K 3/522; H02K 9/19; H02K 2213/03; H02K 2203/12; B60K 1/00; B60K 11/02; B60K 2001/006
USPC .......................................................... 310/54
See application file for complete search history.

(56) References Cited

U.S. PATENT DOCUMENTS

| | | | | |
|---|---|---|---|---|
| 3,479,541 | A * | 11/1969 | Robinson ................. | H02K 9/20 310/64 |
| 8,183,723 | B2 * | 5/2012 | Fee ......................... | H02K 5/203 310/64 |
| 8,970,077 | B2 * | 3/2015 | Murakami ............. | H02K 9/227 310/58 |
| 10,020,706 | B2 * | 7/2018 | Kobes .................... | H02K 15/02 |
| 10,355,570 | B2 * | 7/2019 | Inoue ..................... | H02K 3/24 |

(Continued)

*Primary Examiner* — Alex W Mok
(74) *Attorney, Agent, or Firm* — NSIP Law (57) ABSTRACT

The present invention relates to an improved structure of a core-bobbin assembly without using a support ring, an O-ring, and a gasket which support and cool the core-bobbin assembly of a motor for a vehicle, so that a weight decreases, and a heat transfer area increases. The present invention also relates to a motor cooling method using the same. In the present invention, an outer circumference sheath (210) is added to a bobbin to cover an entirety of a core outer circumferential portion (110) including a cooling surface press-inserted into and in contact with a housing, that is, a recessed outer circumferential surface (120) formed on the core outer circumferential portion (110).

20 Claims, 9 Drawing Sheets

(56) References Cited

U.S. PATENT DOCUMENTS

| | | | |
|---|---|---|---|
| 2014/0197701 A1* | 7/2014 | Hossain | H02K 9/223 |
| | | | 310/52 |
| 2014/0292117 A1* | 10/2014 | Lee | H02K 9/19 |
| | | | 310/54 |
| 2015/0381010 A1* | 12/2015 | Kobes | H02K 1/04 |
| | | | 29/598 |
| 2016/0134169 A1* | 5/2016 | Han | H02K 5/203 |
| | | | 310/54 |
| 2017/0063191 A1* | 3/2017 | Kirkley, Jr. | F16C 35/067 |
| 2017/0141653 A1* | 5/2017 | Okazaki | H02K 9/197 |
| 2017/0163105 A1* | 6/2017 | Lee | H02K 1/185 |
| 2019/0097499 A1* | 3/2019 | Yim | H02K 1/20 |

* cited by examiner

FIG. 1A

Prior Art

FIG. 1B

Prior Art

FIG. 1C

Prior Art

FIG. 2

Prior Art

FIG. 3

Prior Art

FIG. 4

Prior Art

Prior Art

Prior Art

Prior Art

FIG. 11

CORE-BOBBIN ASSEMBLY AND MOTOR COOLING METHOD USING THE SAME

CROSS-REFERENCE TO RELATED APPLICATION

This application claims priority to and the benefit of Korean Patent Application No. 10-2019-0128566, filed on Oct. 16, 2019, the disclosure of which is incorporated herein by reference in its entirety.

BACKGROUND

1. Field of the Invention

The present invention relates to a motor used in an eco-vehicle such as an electric vehicle (EV), a hybrid vehicle (HV), and a plug-in hybrid vehicle (PHV), and more specifically, to a core-bobbin assembly of a water-cooled motor and a motor cooling method using the same.

2. Discussion of Related Art

In a water-cooled motor for an eco-vehicle (electric vehicle (EV), a hybrid vehicle (HV), a plug-in hybrid vehicle (PHV), and the like), a coolant is injected using an injection nipple or pipe extending into the motor and the used coolant is discharged using a discharge nipple or pipe. Heat transfer using the injected coolant is performed while the injected coolant flows through a water passage formed in the motor, a main heating region of the motor is indirectly cooled, and the coolant is discharged.

Heat generated in the motor is mainly caused by a copper loss generated by a coil in which current flows and an iron loss generated by a stator core in which magnetic flux flows. When such a heating amount is increased, serious problems are generated. Burning or dielectric breakdown problems of the coil, a terminal assembly, and the like in which the current flows may be generated, and as a result, the motor does not operate, and thus a vehicle stops. Therefore, cooling of the motor to which much electric energy is supplied is an important issue.

Figure 1A:
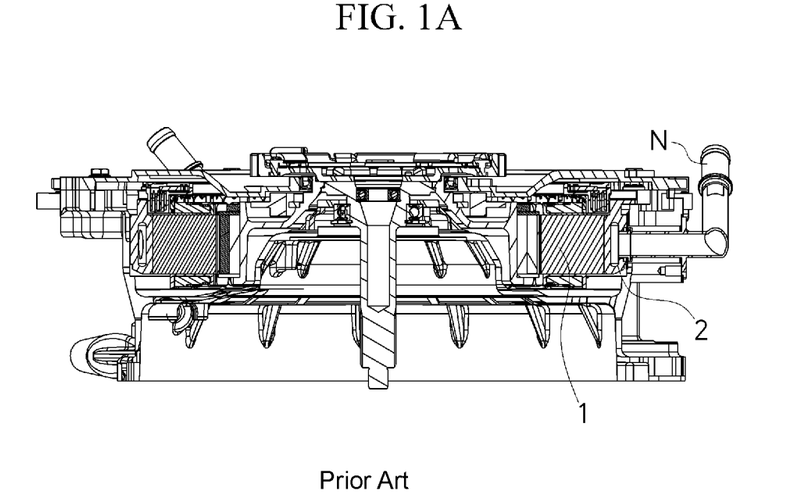
FIGS. 1A to 1C are views illustrating one type (first type) of a coolant passage portion of a conventional driving motor.
Figure 1B:
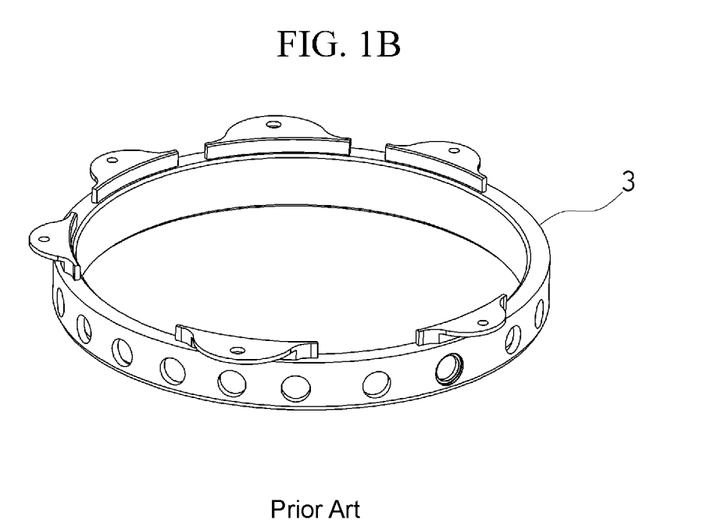
Figure 1C:
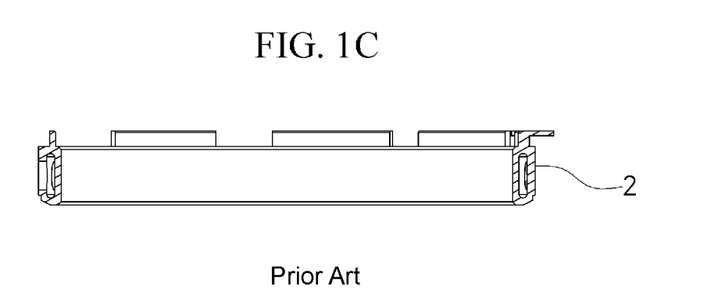

FIGS. 1A to 1C are views illustrating one type (first type) of a conventional coolant passage portion. As shown in a cross-sectional structure in FIG. 1A, a core-bobbin assembly 1 including a stator core and coil, which are main heating portions, and a coolant passage portion 2 which is a flow passage of a coolant cooling the core-bobbin assembly 1, are illustrated. The coolant is injected through a nipple N. The coolant passage portion 2 is implemented using a hollow support ring 3 as shown in FIG. 1B. The coolant flows in a hollow of the hollow support ring 3 to cool the main heating portion 1 which comes into contact with the coolant. The hollow support ring 3 has an inner empty structure of which an entirety is closed except for a portion connected to the nipple (pipe).

Figure 2:
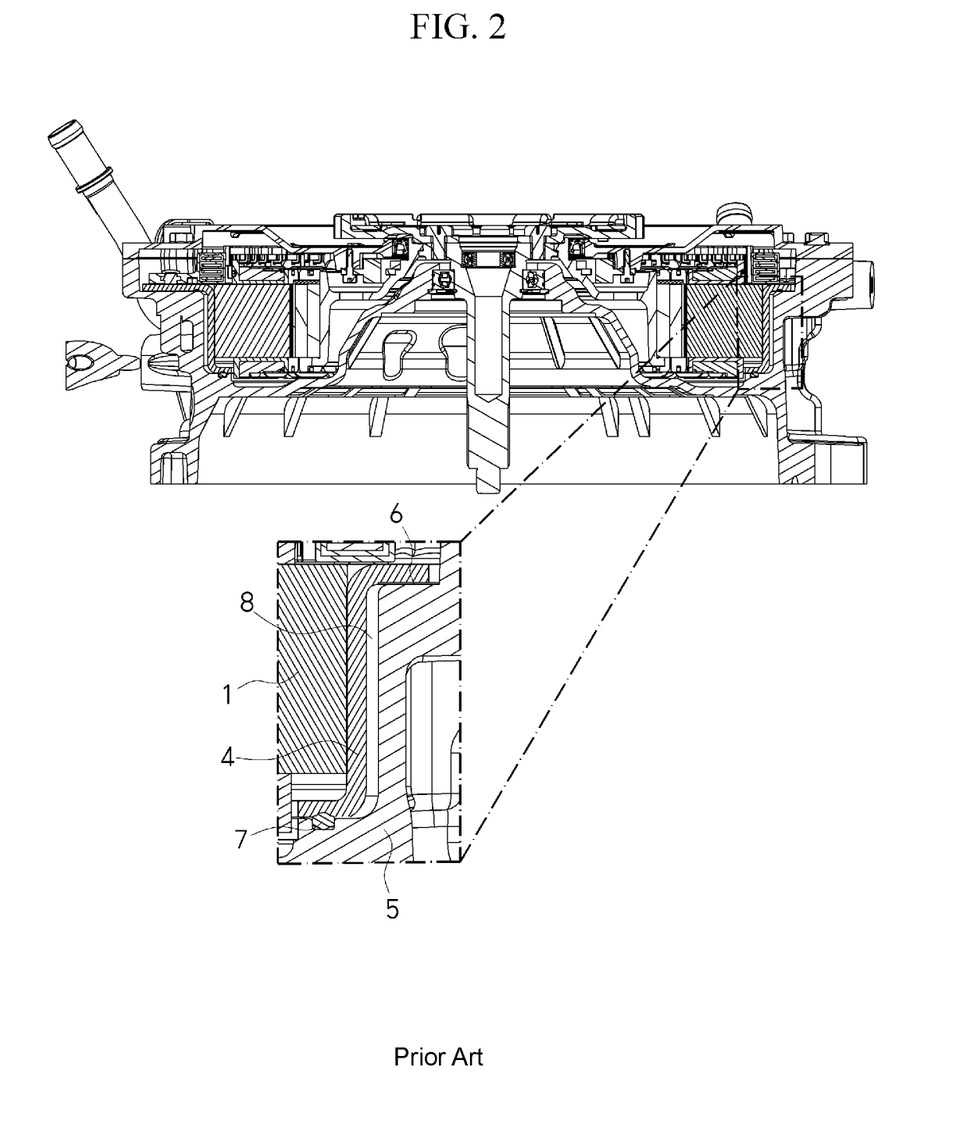
FIG. 2 is a view illustrating another type (second type) of a coolant passage portion of a conventional driving motor.

FIG. 2 is a view illustrating another type (second type) of a conventional coolant passage portion. As shown in the cross-sectional structure, an injection of a coolant into a motor through a nipple (pipe) is the same as that of FIG. 1A. The difference between FIGS. 1A and 2 is that a support ring 4 which is substantially 'ʃ' shaped is engaged with a housing 5 to form a coolant passage portion 8 which is a space through which a coolant passes. A gasket 6 and an O-ring 7 are used for water tightness between the support ring 4 and the housing 5. Although shapes and functions of the support ring 3 and the support ring 4 used in FIGS. 1 and 2 are different from each other, both of the support rings 3 and 4 fix the core-bobbin assembly 1 and simultaneously serve as coolant passage portions 2 and 8.

The conventional support rings for cooling a motor for an EV have a disadvantage in that a weight thereof is large. Particularly, a steel plate support ring manufactured of a steel plate has a weight of 2.7 kg in the case of the first type or has a weight of 1.65 kg in the case of the second type. The weight ratio of the steel plate support ring is large enough to account for 10% or 6% when it is considered that a total weight of the motor is about 28 kg.

In addition, in the conventional EVs, there are quite many components for cooling a motor. The second type has advantages in that a weight is light and a structure is simple when compared to the first type but has a disadvantage in that the number of components is increased by two. This is because of a structure in which the gasket 6 is disposed on a flange, which is in contact with the housing 5, of the support ring 4 and the O-ring 7 is disposed on a lower surface of the support ring 4 to achieve water tightness of the coolant passage portion 8 (see FIG. 2).

Figure 3:
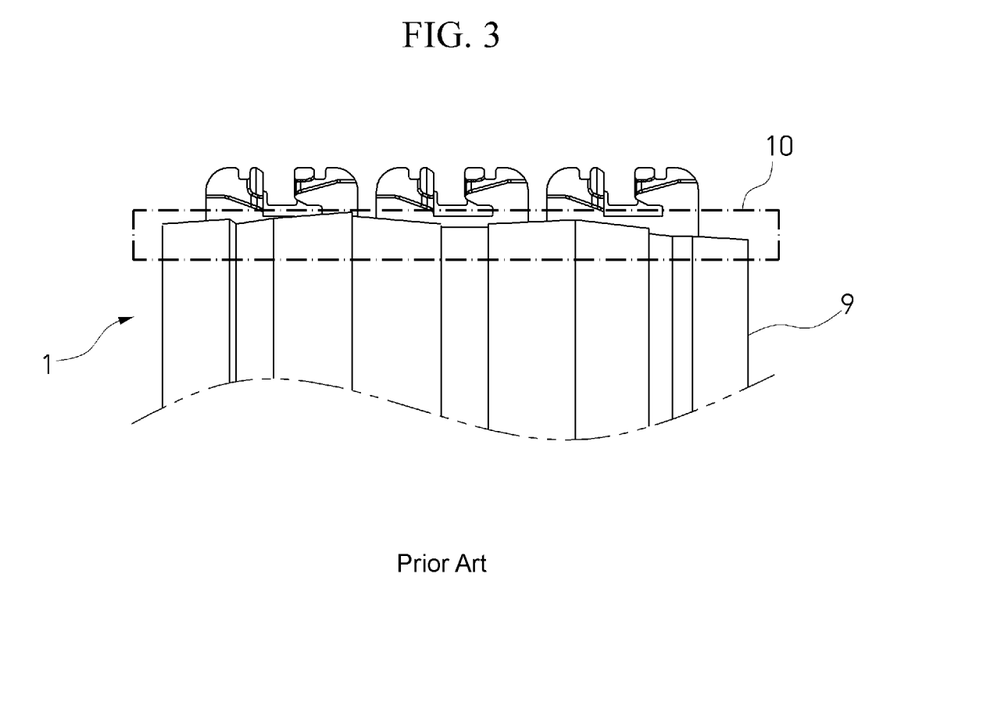
FIG. 3 is a view showing a problem in which upper portions of cores (9) of a conventional core-bobbin assembly are delaminated.

In addition, a core delamination phenomenon occurs. As shown in FIG. 3, a phenomenon occurs in which an upper portion of a stack portion 10 of cores 9 disposed in a core-bobbin assembly 1 is delaminated. This phenomenon is caused by a structure in which each sheet of the cores 9 is horizontally stacked. In addition, when an end of the stack portion 10 of the core is separated, since a distance from a terminal (not shown) assembled to the upper portion decreases, insulation defects may occur. In addition, when it is considered that the core 9 serves as a passage through a magnetic flux passes, since the sheets of the cores 9 are separated from each other and press-inserted into the support ring 4 and a contact area decreases, there is a concern about a separation force and torsion in a shaft direction and separation force reduction in addition to the degradation of electric performance.

Figure 4:
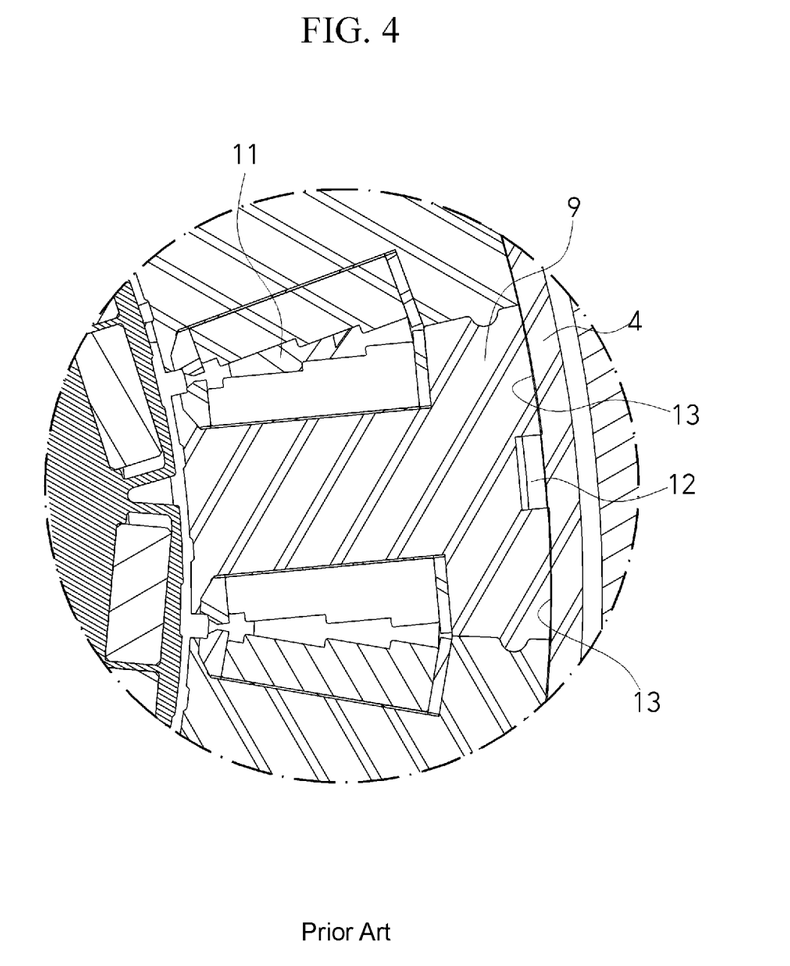
FIG. 4 is a view illustrating a problem of a dead space of the conventional core-bobbin assembly.

Moreover, a heat transfer area is small. The reason why the coolant flows is to lower the temperatures of the core 9 and a coil 11 (see FIG. 4) disposed in the core-bobbin assembly 1, and as a contact area increases, cooling performance is clearly improved. However, conventionally, as shown in FIG. 4, since the support ring 4 is in contact with only an outer circumferential portion 13, that is a cooling surface, of the core 9 and is not in contact with a groove 12 formed in the outer circumferential portion 13, a dead space is present, and thus heat transfer efficiency through the support ring 4 decreases.

SUMMARY OF THE INVENTION

The present invention is directed to providing an improved structure of a core-bobbin assembly without using a support ring, an O-ring, and a gasket which serve to support and cool the core-bobbin assembly so that a weight of the core-bobbin assembly is reduced, and a heat transfer area thereof is increased. In addition, the present invention is directed to providing a motor cooling method using the improved structure of the core-bobbin assembly.

In order to solve the above-described objective, a structure and a function of a core-bobbin assembly are improved according to following concepts.

First, a core-bobbin assembly is improved to implement functions of 'core-bobbin assembly fixing' and 'coolant passage forming' which are functions of the above-described support ring and to omit the support ring. Accordingly, a total weight of a motor is decreased, and thus it is expected that fuel consumption is reduced due to the decreased weight.

Second, when the core-bobbin assembly is improved to achieve water tightness using a force by which a bobbin is press-inserted into a housing, a gasket and an O-ring needed to secure the water tightness may be omitted, and two components can be reduced.

Third, the core-bobbin assembly is improved to have a structure configured to prevent delamination of a core so as to secure a sufficient insulation distance and prevent electrical and mechanical performance reduction, and a structure configured to press each sheet of the core.

Fourth, the core-bobbin assembly is improved to have a structure configured to cool an entire surface of an outer circumferential portion of the core such that a dead space is not present so as to prevent a phenomenon in which a terminal is broken down due to heat generation or the core is heated and delaminated.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same will be clearly understood through embodiments described in detail with reference to the accompanying drawings. However, the present invention is not limited to the embodiments to be disclosed below but may be implemented in various different forms. The embodiments are provided in order to fully explain the present invention and fully explain the scope of the present invention for those skilled in the art. The scope of the present invention is defined by the appended claims. Meanwhile, the terms used herein are provided only to describe the embodiments of the present invention and not for purposes of limitation. Unless the context clearly indicates otherwise, the singular forms include the plural forms. It will be understood that the terms "comprise" or "comprising," when used herein, specify some stated components, steps, operations and/or elements but do not preclude the presence or addition of one or more other components, steps, operations and/or elements.

Hereinafter, the exemplary embodiments of the present invention will be described in detail with reference to the accompanying drawings. When reference numerals are assigned to elements of each drawing and the same elements are illustrated in different drawings, the same reference numerals are assigned to the same elements whenever possible. In descriptions of the present invention, when detailed descriptions of related known configurations or functions are deemed to unnecessarily obscure the gist of the present invention, they will be omitted.

Figure 5:
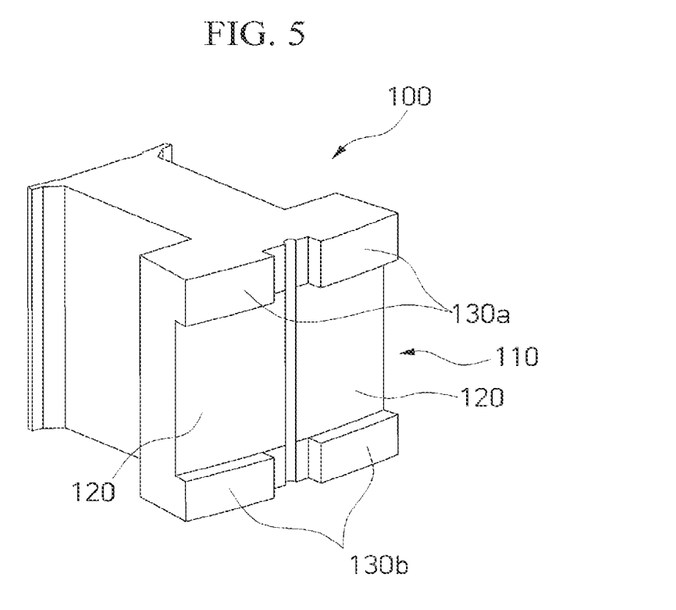
FIG. 5 is a view illustrating the form of a core (100) according to the present invention.
Figure 6:
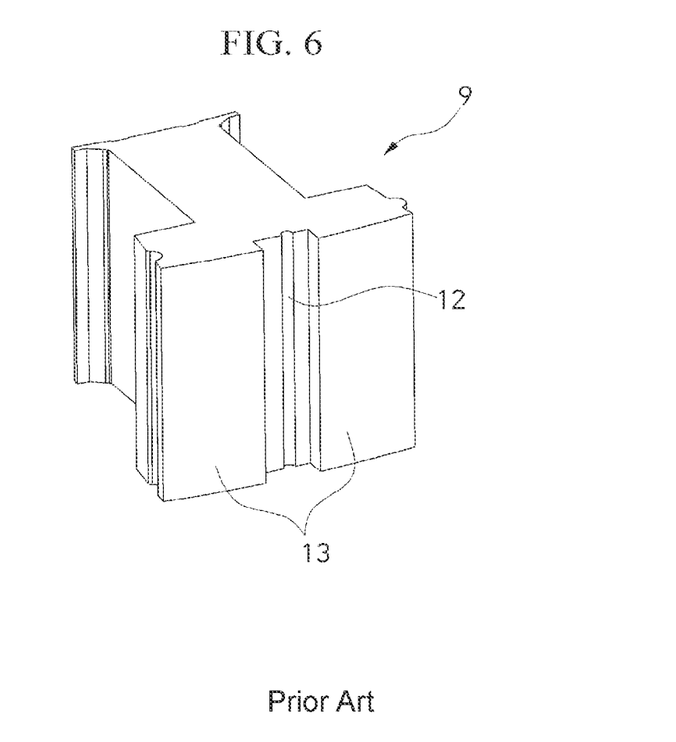
FIG. 6 is a view illustrating the form of a conventional core in comparison to FIG. 5.

FIG. 5 is a view illustrating the form of a core 100 according to the present invention. FIG. 6 is a view illustrating the form of a conventional core in comparison to FIG. 5 (FIG. 6 is the view illustrating only a core 9 separated from that of FIG. 4).

In comparison with and in reference to FIGS. 5 and 6, unlike a conventional structure, in a structure of the core 100 of the present invention, a core outer circumferential portion 110 does not include a smooth curved surface (surface press-inserted into a housing) but includes a recessed outer circumferential surface 120 formed by recessing an outer surface of the outer circumferential portion 110 inward thereof. According to one embodiment, a surface of the core outer circumferential portion 110 is recessed except for an upper portion 130a and a lower portion 130b of the core outer circumferential portion 110 to form the recessed outer circumferential surface 120—here, concepts of upper and lower refer to upper and lower in the drawing but do not refer to absolute concepts of upper and lower. Accordingly, since the recessed outer circumferential surface 120 is formed, a groove 12, which is a conventional heat transfer dead space illustrated in FIG. 6, is included in the recessed outer circumferential surface 120. Accordingly, the conventional structure has the heat transfer dead space due to a central portion, that is, the groove 12, of the core outer circumferential portion 13, but in the structure of the present invention, the dead space disappears and a heat transfer area can be increased.

The recessed outer circumferential surface 120 may serve as a coolant passage 220 (as will be described below) when the core is coupled to a bobbin (which will be described below).

Figure 7:
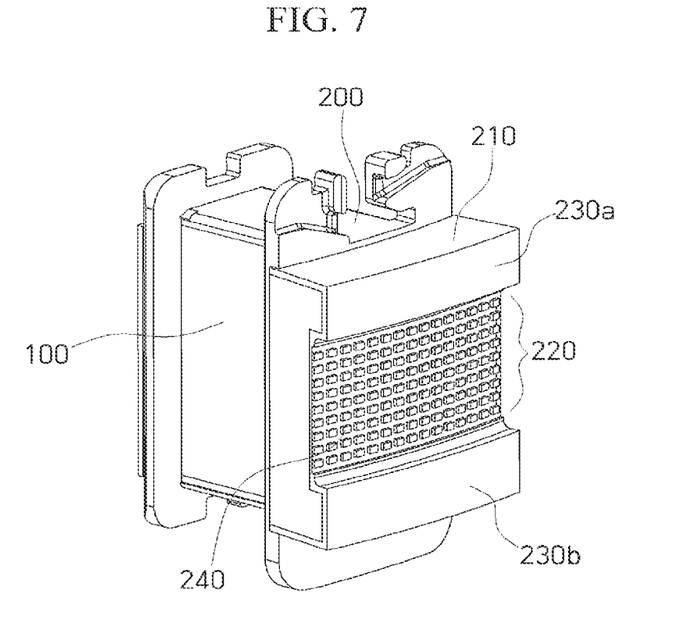
FIG. 7 is a view illustrating the form of a core-bobbin assembly in which the core (100) is coupled to a bobbin (200) according to the present invention.
Figure 8:
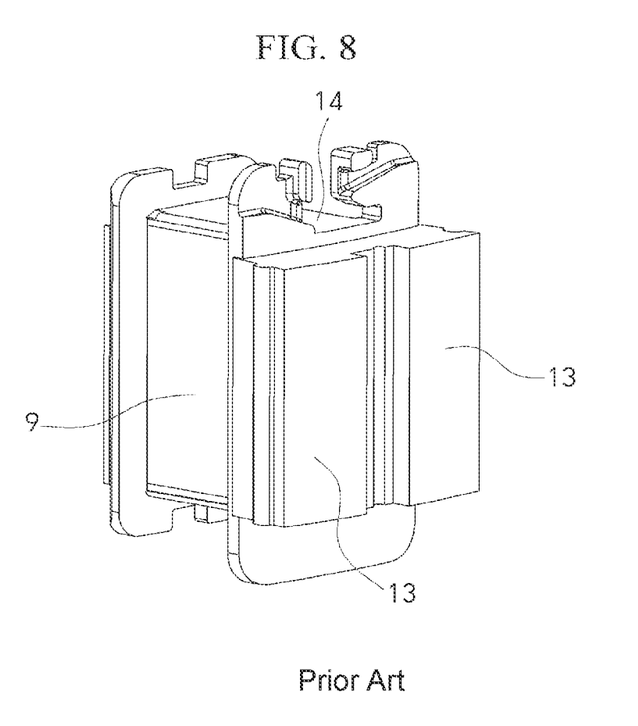
FIG. 8 is a view illustrating the form of the conventional core-bobbin assembly in which the core (9) is coupled to a bobbin (14) in comparison to FIG. 7.
Figure 9:
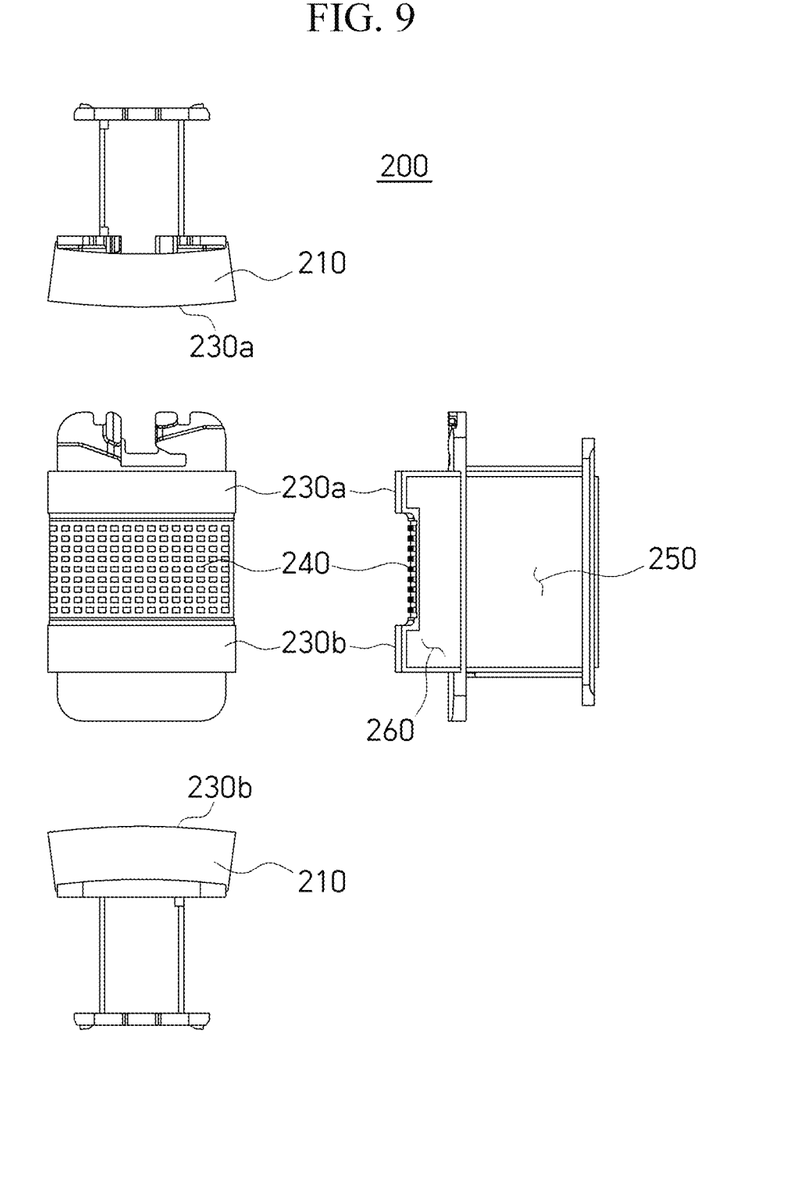
FIG. 9 is a view illustrating a structure of the bobbin (200) according to the present invention.
Figure 10:
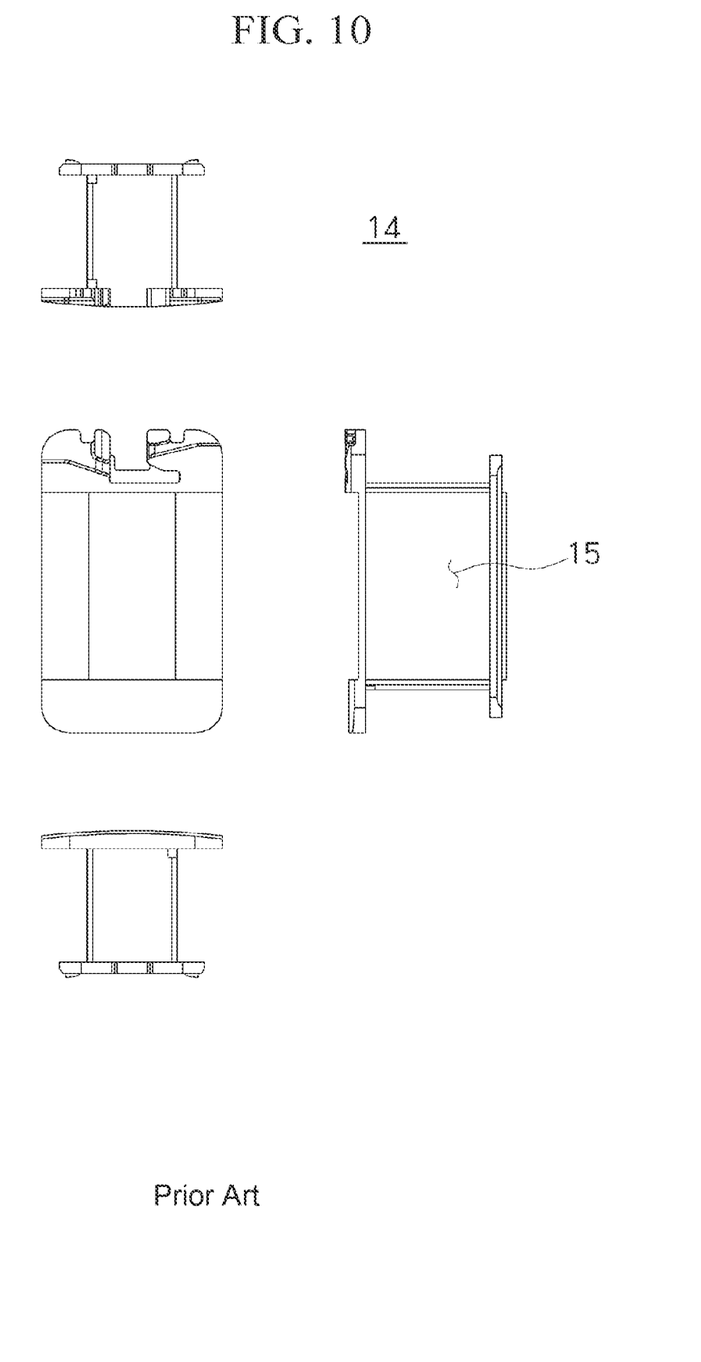
FIG. 10 is a view illustrating a structure of the conventional bobbin (14)

FIG. 7 is a view illustrating the form of the core-bobbin assembly in which the core 100 is coupled to a bobbin 200 shown in FIG. 5 according to the present invention. FIG. 8 is a view illustrating the form of the conventional core-bobbin assembly in which the core 9 is coupled to a bobbin 14 in comparison to FIG. 7. In addition, FIG. 9 is a view illustrating a structure of the bobbin 200 according to the present invention, and FIG. 10 is a view illustrating a structure of the conventional bobbin 14. The core-bobbin assembly according to the present invention will be described with reference to FIGS. 7 to 10.

First, as shown in FIG. 8, generally, just as the core 9 is coupled to the bobbin 14 to form the core-bobbin assembly;

in the present invention, as shown in FIG. 7, the core 100 is coupled to the bobbin 200 to form the core-bobbin assembly. In the present invention, as described with reference to FIG. 5, an outer circumference sheath 210 is added to the bobbin to cover an entirety of the core outer circumferential portion 110 including a cooling surface press-inserted into and in contact with the housing, i.e., the recessed outer circumferential surface 120 formed on the core outer circumferential portion 110. That is, conventionally, as illustrated in FIG. 8, since the bobbin 14 does not cover the outer circumferential portion 13 of the core 9, the outer circumferential portion 13 is exposed. However, in the proposed bobbin 200 of the present invention, as illustrated in FIGS. 5 and 7, the outer circumference sheath 210 of the bobbin 200 covers the entirety of the core outer circumferential portion 110. To this end, the outer circumference sheath 210 of the bobbin 200 of the present invention is simultaneously manufactured with the remaining parts of the bobbin through an insert-injection molding process.

As described above, since the outer circumference sheath 210 covers the entirety of the core outer circumferential portion 110 including the recessed outer circumferential surface 120, the recessed outer circumferential surface 120 is formed to a shape of a lateral channel as shown in FIG. 7 when the bobbin 200 is press-inserted into a housing 5 (see FIG. 2), a space is formed between the housing and the bobbin 200, and a coolant flows through the space so that cooling may be performed. That is, the space becomes the coolant passage 220.

In FIG. 7, a transversal cross section (vertically cut section in FIG. 7) of the outer circumference sheath 210 is substantially '[' shaped. Portions 230a and 230b which are uplifted (protrude) from an upper portion and a lower portion of the outer circumference sheath 210 are portions corresponding to an upper portion 130a and a lower portion 130b of the outer circumferential portion 110 of the core 100, and a base portion 240, that is, a portion forming the coolant passage 220, having a '[' shape is a portion corresponding to the recessed outer circumferential surface 120 of the outer circumferential portion 110. Small protrusions are formed on the base portion 240. The protrusions are to increase heat transfer surface area of the cooling surface of the coolant passage 220. In a case in which the outer circumference sheath 210 is formed as an injected object, the protrusions may also be formed with the outer circumference sheath 210.

In addition, since the outer circumference sheath 210 entirely covers the core outer circumferential portion 110, a force by which each sheet, which is positioned at an upper end and a lower end, of the core 100 is delaminated in an axial direction is physically blocked, and thus a phenomenon in which an upper portion of a stack portion 10 of each of the cores 9 is delaminated as shown in FIG. 3 is suppressed.

The above description will be clearer with reference to FIG. 9 showing the structure of the bobbin 200 according to the present invention and FIG. 10 showing the structure of the conventional bobbin 14. The bobbin of the present invention includes a first space 250 which covers a body portion of the core and a second space 260 which covers the core outer circumferential portion 110 of the core as shown in a right side view of FIG. 9. An outer surface of the second space 260 becomes the outer circumference sheath 210. However, in the conventional bobbin, as shown in a right side view of FIG. 10, only a first space 15 which covers a body portion of the core is present, and the core outer circumferential portion 13 is directly exposed. As described above, the outer circumference sheath 210 shown in the right view and a front view of FIG. 9 has a structure including the upper portion 230a, the lower portion 230b, and the base portion 240.

Figure 11:
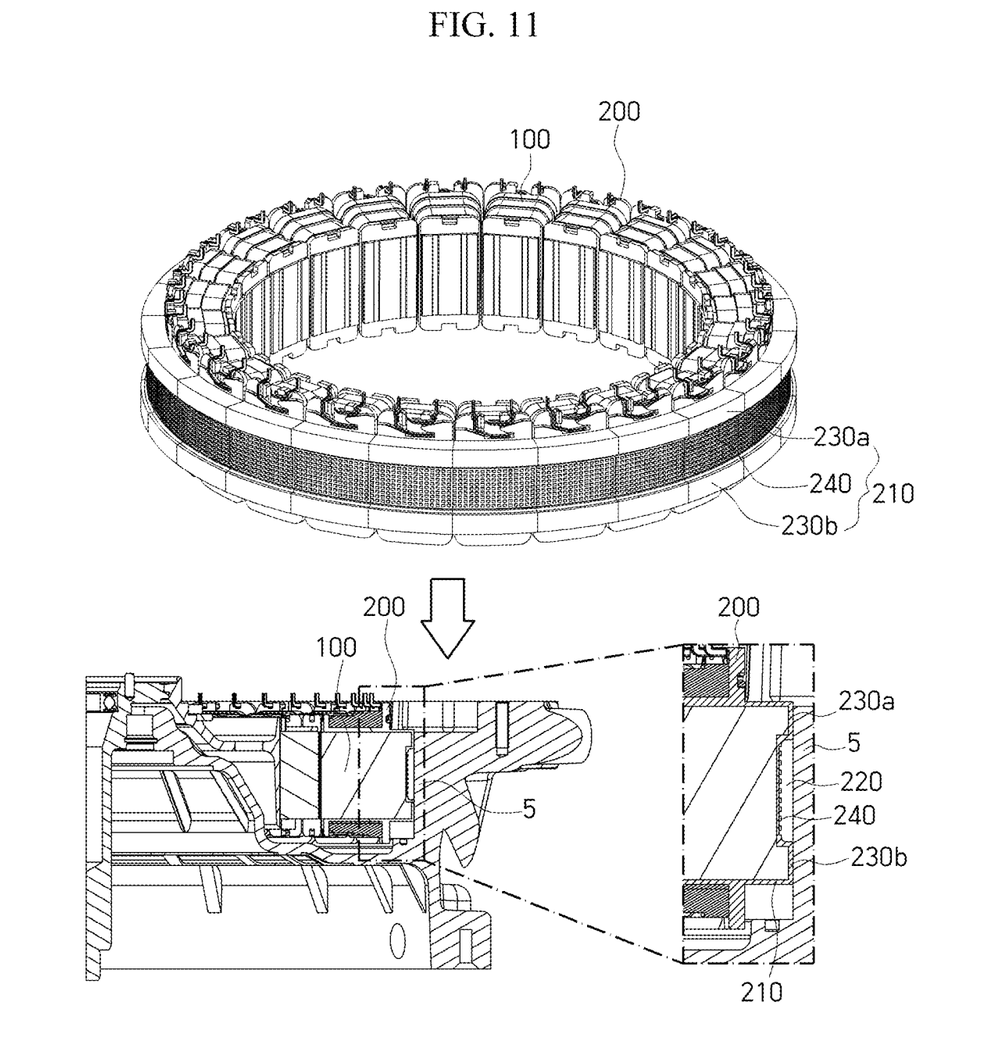
FIG. 11 is an exploded view illustrating the core-bobbin assembly in an X24 array structure using the core and the bobbin according to the present invention and a vicinity of a coolant passage (220) formed in a driving motor to which the assembly is applied.

FIG. 11 is a view illustrating the core-bobbin assembly in an X24 array structure using the core and the bobbin according to the present invention, and an magnified view showing the vicinity of the coolant passage 220 formed between the housing 5 and the base portion 240 of the outer circumference sheath 210 of the bobbin of a driving motor to which the assembly is applied.

The coolant passage 220 is formed between the base portion 240 of the outer circumference sheath 210 of the bobbin 200 which covers the recessed outer circumferential surface 120 of the core outer circumferential portion 110 of the core 100 and the housing 5, and the coolant moves along the water passage so that a cooling function is performed. In an upper view of FIG. 11, it may be shown that, since a plurality of cores 100 are arranged, outer circumference sheaths 210 attached to the cores are connected so that coolant passages 220 are sequentially formed in a circumferential direction.

According to the present invention, the following advantages can be obtained. Decreased Number of Components: an O-ring, a gasket, a support ring are omitted. Low Weight: Since a support ring, which is conventionally manufactured of a steel plate, is formed of an engineering plastic, a weight is decreased so that an improved fuel consumption effect can be expected. Increase in Heat Transfer Area: In the conventional structure, since a dead space which is not in contact with an outer circumference of a core is present, a heat transfer area is small, and since a support ring is formed of a steel plate, the dead space is present.

What is more, in the present invention, since a proposed bobbin can be formed to have any shape through an insert-injection molding process, a dead space is not present, and a heat transfer area is increased so as to be expected to contribute to improve a cooling effect. On the basis of a stator core used in a current commercial manufacturing, an area of 10.7 cm$^2$ is cooled per one core. When a water passage is formed to have a height of 28 mm using the proposed structure of the present invention, a contact area can be increased to 14 cm$^2$.

Although the structure of present invention has been described in detail with reference to the exemplary embodiments thereof, it will be understood by those skilled in the art that the invention may be performed in other concrete forms without changing the technological scope and essential features. The above-described embodiments should be considered in a descriptive sense only and not for purposes of limitation. The scope of the present invention is defined not by the detailed description but by the appended claims. All modifications and equivalents that fall within the scope of the appended claims will be construed as being included in the present invention.

What is claimed is:

1. A core-bobbin assembly in a motor in which a core of a stator is cooled by a coolant, comprising:
   a core, wherein the core comprises:
      a core outer circumferential portion, which is in contact with a housing of the motor, of the core and the housing; and
      a recessed outer circumferential surface formed by recessing partial surface of a surface, which is in contact with the housing, of the core outer circumferential portion;
   a bobbin, wherein the bobbin comprises:

an outer circumference sheath covering the core outer circumferential portion and is coupled to the core; and a base portion formed on the outer circumference sheath corresponding to the recessed outer circumferential surface, wherein the base portion and the housing are configured to form a coolant passage through which a coolant flows.

2. The core-bobbin assembly of claim 1, wherein a plurality of protrusions are formed on the base portion of the outer circumference sheath of the bobbin to increase a heat transfer area of the coolant.

3. The core-bobbin assembly of claim 1, wherein the outer circumference sheath of the bobbin is simultaneously manufactured with a remaining portion of the bobbin through an insert-injection molding process.

4. The core-bobbin assembly of claim 1, wherein the outer circumference sheath of the bobbin covers an entirety of the core outer circumferential portion.

5. The core-bobbin assembly of claim 1, wherein the outer circumference sheath of the bobbin further comprises a portion which protrudes further than the base portion corresponding to the recessed outer circumferential surface and is in contact with the housing.

6. The core-bobbin assembly of claim 1, wherein the core further comprises:
an upper portion; and
a lower portion, wherein the recessed outer circumferential surface is formed between the upper portion and the lower portion.

7. The core-bobbin assembly of claim 1, wherein the bobbin further comprises a first space configured to cover a body portion of the core, and
wherein the bobbin further comprises a second space configured to cover the core outer circumferential portion.

8. The core-bobbin assembly of claim 7, wherein an exterior of the second space comprises the outer circumference sheath.

9. The core-bobbin assembly of claim 1, wherein the core-bobbin assembly further comprises a plurality of cores and a plurality of bobbins sequentially arranged in a circumferential direction.

10. A bobbin included in a motor, in which a core of a stator is cooled by a coolant, and coupled to the core, the bobbin comprising an outer circumference sheath which covers a core outer circumferential portion, which is in contact with a housing, of the core,
wherein the outer circumference sheath comprises a base portion forming a coolant passage which is formed between the base portion and the housing of the motor and through which a coolant flows, and
wherein the outer circumference sheath of the bobbin further comprises a portion which protrudes further than the base portion to be in contact with the housing.

11. The bobbin of claim 10, wherein a plurality of protrusions are formed on the base portion of the outer circumference sheath of the bobbin to increase a heat transfer area of the coolant.

12. The bobbin of claim 10, wherein the outer circumference sheath of the bobbin is simultaneously manufactured with a remaining portion of the bobbin through an insert-injection molding process.

13. The bobbin of claim 10, wherein the outer circumference sheath of the bobbin covers an entirety of the core outer circumferential portion.

14. The bobbin of claim 13, wherein a plurality of cores and a plurality of bobbins sequentially arranged in a circumferential direction as a core array.

15. A method of cooling a motor in which a core of a stator is cooled by a coolant, the method comprising:
forming a coolant passage which is disposed between a core outer circumferential portion, which is in contact with a housing of the motor, of the core and the housing and through which a coolant flows;
providing a recessed outer circumferential surface formed by recessing a partial surface of a surface, which is in contact with the housing, of the core outer circumferential portion; and
coupling a bobbin including an outer circumference sheath, which covers the core outer circumferential portion, to the core,
wherein a base portion corresponding to the recessed outer circumferential surface is provided to the outer circumference sheath of the bobbin to form the coolant passage in a space between the base portion and the housing.

16. The method of claim 15, further comprising forming a plurality of protrusions on the base portion of the outer circumference sheath of the bobbin so as to increase a heat transfer area of the coolant.

17. The method of claim 15, wherein the outer circumference sheath of the bobbin is simultaneously manufactured with a remaining portion of the bobbin through an insert-injection molding process.

18. The method of claim 15, further comprising covering, by the outer circumference sheath of the bobbin, an entirety of the core outer circumferential portion.

19. The method of claim 15, further comprising:
arranging a plurality of cores sequentially in a circumferential direction to form a core array;
providing a plurality of bobbins onto respective ones of the plurality of cores in the core array; and
press fitting the plurality of cores and the plurality of bobbins of the core array into the housing.

20. The method of claim 19, wherein each outer circumference sheath of the plurality of bobbins in the core array form the coolant passage.

* * * * *